United States Patent [19]

Lister

[11] Patent Number: 4,525,295

[45] Date of Patent: Jun. 25, 1985

[54] METHOD OF AND COMPOSITION FOR PRODUCING GLOW PRINTING

[75] Inventor: Jerry D. Lister, Jefferson County, Ky.

[73] Assignee: Adver-Togs, Inc., New Albany, Ind.

[21] Appl. No.: 264,580

[22] Filed: May 18, 1981

Related U.S. Application Data

[62] Division of Ser. No. 153,578, May 27, 1980, Pat. No. 4,302,487.

[51] Int. Cl.³ .............................................. B05D 1/32
[52] U.S. Cl. ........................... 252/301.36; 252/301.35
[58] Field of Search ................... 427/157; 252/301.35, 252/301.36

[56] References Cited

U.S. PATENT DOCUMENTS

| | | | |
|---|---|---|---|
| 2,357,732 | 9/1944 | Ehrlich | 252/301.36 |
| 2,389,781 | 11/1945 | Isenberg | 252/301.36 |
| 2,436,182 | 2/1948 | Schmidling | 252/301.36 |
| 2,716,082 | 8/1955 | Smith | 252/301.36 |
| 2,938,292 | 5/1960 | Jaskowsky | 252/301.36 |
| 3,565,815 | 2/1971 | Christy | 252/301.36 |

OTHER PUBLICATIONS

The Condensed Chemical Dictionary, Fifth Edition, 1956, p. 858.
The Condensed Chemical Dictionary, Tenth Edition (New York; Reinhold Publishing Corporation, 1981), pp. 469, 808 and 809.

*Primary Examiner*—Paul R. Michl
*Attorney, Agent, or Firm*—Warren D. Flackbert

[57] ABSTRACT

A method of and composition for producing glow printing which obviates any necessity for using heat transfer procedures for presenting phosphorescent indicia on an article. The invention encompasses the formulation of a particularized ink which is readily adapted, through screen printing techniques, for usage in the application of identification/designs on clothing and/or sports items, including caps, t-shirts, running shorts, jackets and the like.

The method and composition utilizes a plastisol base, with an added solvent and solid phosphorescent pigment, the latter being in a variety of colors. The invention is usable on a wide variety of materials including nylon, polyester and cotton, as well as blends of the preceding.

2 Claims, No Drawings

METHOD OF AND COMPOSITION FOR PRODUCING GLOW PRINTING

The present application is a division of patent application Ser. No. 153,578, filed May 27, 1980, entitled METHOD OF AND COMPOSITION FOR PRODUCING GLOW PRINTING, which is maturing into U.S. Pat. No. 4,302,487.

As is known, it is desirable, not only for decorative but for identification reasons, to apply designs and/or like graphics on wearing apparel, such as the ever popular t-shirts, athletic shirts, sporting caps, and the like. The preceding has been accomplished through a variety of printing techniques, such as that described and claimed in pending patent application Ser. No. 141,330, entitled METHOD OF AND COMPOSITION FOR PRODUCING RAISED PRINTING, and with the same inventor as herein.

In order to more fully expand the preceding, a further field of interest lies in transfers which are phosphorescent in nature, i.e. present a glowing or visible message in a darneed area. In other words, the presented pattern has a further far-reaching area of effect, thus supplying added importance in the instance of advertising a particular product and/or service.

A present limitation to the latter, however, is in the accomplishment and/or production thereof. In this connection, such is mainly in the form of a heat transfer procedure, i.e. the usage of an ink including a phosphorescent pigment distributed in a pattern on paper which, with the application of heat on the paper, causes the transfer of the pattern onto the wearing apparel or like item under process. Thus, the prospective user has been limited in selection to availability of the aforesaid type of heat transfer patterns.

The invention has overcome the preceding difficulty in affording a composition and method for achieving phosphorescent or glow printing, more particularly defined by the usage of a clear plastisol base, having an adhesive physical property, subsequently thinned with a solvent and processed, after mixing within a preselected temperature range, with a solid phosphorescent pigment, for permitting direct silk-screen printing. In other words, the invention affords direct transfer of the pattern to the item at hand, i.e. by silk-screen printing techniques, in contrast to the former procedure of inking the pattern onto paper and, thereafter, transferring such onto the item.

The resulting ink, which the applicant identifies as "glow" ink, can result in a variety of finished colors, depending upon the particular phosphorescent pigment employed, to-wit, red, pink, orange, blue, yellow, green and magenta. In some instances, and after application to the particular wearing article, a varnish or other coating substance may be employed for purposes of sealing and, thus, further assure any possible unwanted peeling effect (the latter being sometimes occasioned by the particular type of material onto which the glow ink is applied).

In any event, the ink composition of the invention includes a clear plastisol base having adhesive qualities, such being a commercially available component. The aforesaid plastisol base is thinned through the usage of mineral spirits or solvents, the latter being, for example, of the type marketed under the trade names "Exlene" or "Exloge," and, thereafter, and importantly, mixed at a high rate of speed. The latter is accomplished within an approximate 40° to 50° Fahrenheit temperature range, with the desired result being to achieve and produce air pockets.

At such time, a solid phosphorescent pigment, in any preselected color, is added, where such is entrained in the aforesaid air pockets. In a typical composition, ten parts of solid phosphorescent pigment are mixed with ninety parts of the colorless plastisol base. In any event, with the addition of the solid phosphorescent pigment, the composition is warmed to an approximate 70° to 80° Fahrenheit temperature range and, thereafter, permitted to assume a room temperature.

In other words, and as apparent, the glow ink is accomplished in a simple manner, i.e. where the air pockets entrain the solid colored pigment, with the latter providing the desired phosphorescent qualities. Thereafter, the colored glow ink is applied to the article under process through a direct known printing procedure, e.g. stenciling, being heated, as through infra-red techniques, to, perhaps, 230° Fahrenheit for drying purposes. As a matter of record, the glow ink is absorbed into the material on which such is applied to a depth approximating two mils and, depending upon the mesh of the silk-screen stencil employed, is raised to a range of three mils to the touch.

As a matter of summary, therefore, the glow printing ink achieved by the invention affords an important contribution in the application of phosphorescent indicia onto a desired item, particularly the types employed in sporting and/or out-of-doors activities. The manufacturing of the glow ink is attained through a mixing step, within a preselected temperature range, which permits the entraining, in air pockets, of the solid phosphorescent pigment in a suspended state throughout the mixture. In other words, such mixing, achieved at an approximate refrigerator temperature level, serves to accomplish the later introduction of solid phosphorescent pigment into the thinned plastisol base. In any event, the resulting glow ink presents physical characteristics which permits direct application to the item under process, as through a conventional silk-screen technique.

As stated, a variety of end colors can be achieved, where the usage of glow ink is adaptable to all types of fabrics and, importantly, those which are in extensive use on athletic apparel including caps. The method of achieving the glow ink results in a consistent and/or homogeneous imprinted color, where the plastisol base minimizes loosening or obliteration during ordinary wear, laundering or the like. If needed, a protective coating can be applied under certain circumstances, as, for example, in the instance of a hard surface material.

Thus, it should be evident that the preceding provides a process and composition which affords a glow ink procedure obviating the necessity of using heat transfer paper for any given design. The described method and composition is susceptible to changes within the spirit of the invention, including the type of thinner employed, the duration of mixing, i.e. such can be in multiple steps, and the like. Thus, the preceding should be considered as illustrative and not as limiting the scope of the following claims:

I claim:

1. A composition for achieving direct glow printing on a fabric comprising a plastisol base, a solvent thinning said plastisol base, and a solid phosphorescent pigment introduced into air pockets in the mixture of said plastisol base and said solvent.

2. The composition of claim 1 where said solid phosphorescent pigment has a preselected color.

* * * * *